United States Patent
Boissonade et al.

(10) Patent No.: US 11,425,352 B2
(45) Date of Patent: Aug. 23, 2022

(54) VIEW SYNTHESIS

(71) Applicant: ORANGE, Issy-les-Moulineaux (FR)

(72) Inventors: Patrick Boissonade, Chatillon (FR); Joël Jung, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/291,817

(22) PCT Filed: Oct. 22, 2019

(86) PCT No.: PCT/FR2019/052509
§ 371 (c)(1),
(2) Date: May 6, 2021

(87) PCT Pub. No.: WO2020/094942
PCT Pub. Date: May 14, 2020

(65) Prior Publication Data
US 2022/0006996 A1   Jan. 6, 2022

(30) Foreign Application Priority Data

Nov. 9, 2018 (FR) ...................................... 1860351

(51) Int. Cl.
*H04N 13/122*   (2018.01)
*H04N 13/161*   (2018.01)
(Continued)

(52) U.S. Cl.
CPC ......... *H04N 13/122* (2018.05); *H04N 13/111* (2018.05); *H04N 13/161* (2018.05);
(Continued)

(58) Field of Classification Search
CPC .. H04N 13/122; H04N 13/111; H04N 13/161; H04N 2013/0081; H04N 2213/005
(Continued)

(56) References Cited

U.S. PATENT DOCUMENTS

| | | | |
|---|---|---|---|
| 2013/0162763 A1* | 6/2013 | Cheng | H04N 13/128 348/42 |
| 2015/0043808 A1* | 2/2015 | Takahashi | G06T 5/50 382/154 |

(Continued)

FOREIGN PATENT DOCUMENTS

| | | |
|---|---|---|
| WO | 2013030452 A1 | 3/2013 |
| WO | 2014183787 A1 | 11/2014 |
| WO | 2016067541 A1 | 5/2016 |

OTHER PUBLICATIONS

English translation of the Written Opinion of the International Searching Authority dated Feb. 12, 2020 for corresponding International Application No. PCT/FR2019/052509, filed Oct. 22, 2019.
(Continued)

*Primary Examiner* — Thai Q Tran
*Assistant Examiner* — Stephen R Smith
(74) *Attorney, Agent, or Firm* — David D. Brush; Westman, Champlin & Koehler, P.A.

(57) ABSTRACT

A method for synthesizing an image of a view from images of N (N>2), implemented by an image synthesis device. The method includes: projecting, to a position corresponding to the image of the view to be synthesized, N depth maps associated with the N views, respectively; for at least one given pixel of at least one projected depth map, for which a depth value has been associated on completion of projection, modifying the depth value of the at least one given pixel if an item of reliability information associated with the depth value is at a certain value, the modification using the depth value of a pixel whose position corresponds to that of the at least one given pixel, in at least one other projected depth map, which generates at least one modified projected depth map.

16 Claims, 5 Drawing Sheets

Figure 1:
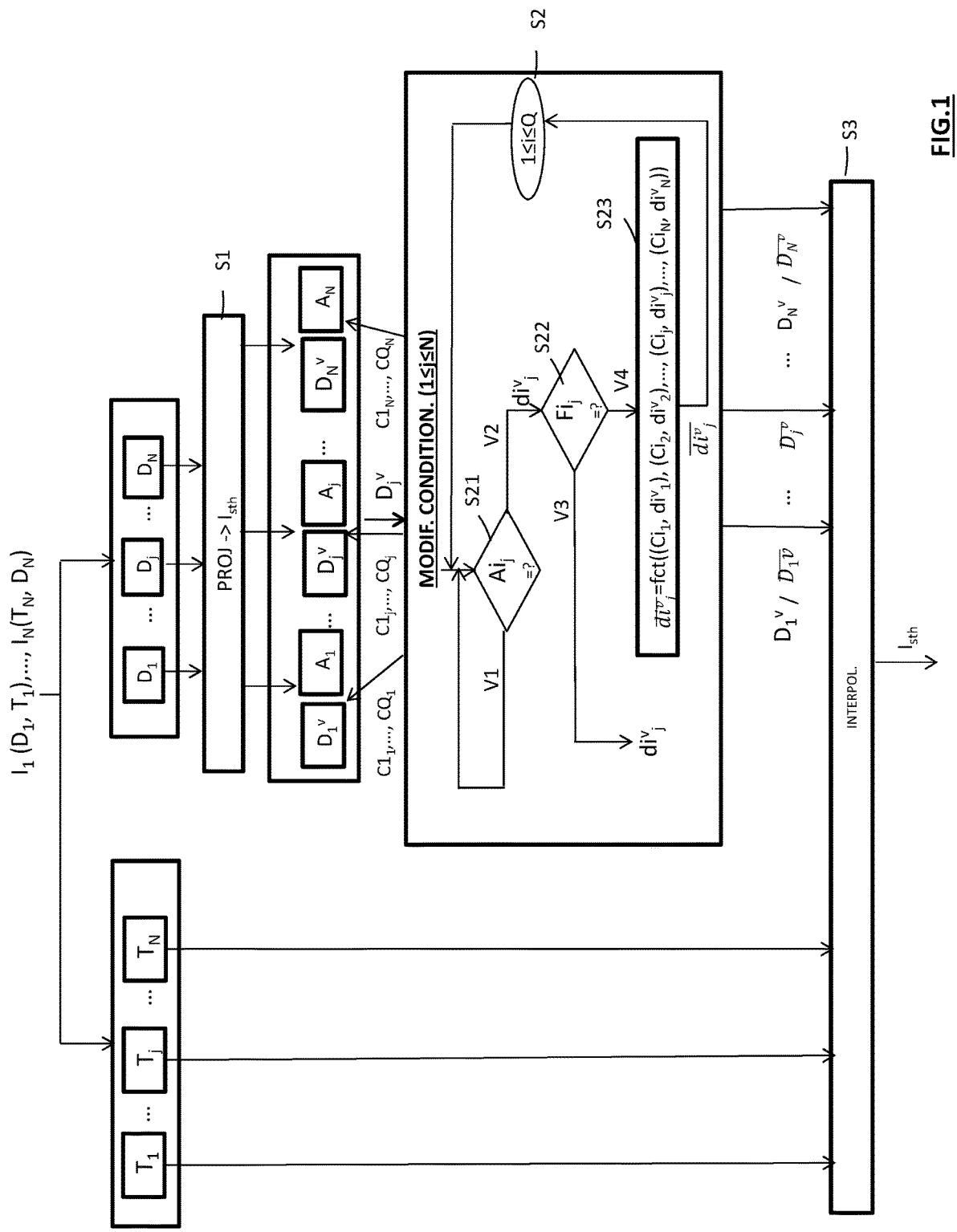

(51) Int. Cl.
*H04N 13/111* (2018.01)
*H04N 13/00* (2018.01)

(52) U.S. Cl.
CPC ............... *H04N 2013/0081* (2013.01); *H04N 2213/005* (2013.01)

(58) Field of Classification Search
USPC ............... 348/42, 43, 47; 345/419; 382/154
See application file for complete search history.

(56) References Cited

U.S. PATENT DOCUMENTS

2017/0272724 A1* 9/2017 Lim .................... H04N 13/194
2019/0197715 A1* 6/2019 Rebecq ............... H04N 13/111
2020/0228777 A1* 7/2020 Dore .................... H04N 13/161

OTHER PUBLICATIONS

Erhan Ekmekcioglu et al., "Content Adaptive Enhancement of Multi-View Depth Maps for Free Viewpoint Video", IEEE Journal of Selected Topics in Signal Processing, IEEE, US, vol. 5, No. 2, Apr. 1, 2011 (Apr. 1, 2011), pp. 352-361, DOI: 10.1109/JSTSP.2010.2052783, XP011350690.
International Search Report dated Jan. 28, 2020 for corresponding International Application No. PCT/FR2019/052509, Oct. 22, 2019.
Written Opinion of the International Searching Authority dated Jan. 28, 2020 for corresponding International Application No. PCT/FR2019/052509, filed Oct. 22, 2019.

\* cited by examiner

VIEW SYNTHESIS

CROSS-REFERENCE TO RELATED APPLICATIONS

This Application is a Section 371 National Stage Application of International Application No. PCT/FR2019/052509, filed Oct. 22, 2019, which is incorporated by reference in its entirety and published as WO 2020/094942 A1 on May 14, 2020, not in English.

1. FIELD OF THE INVENTION

The present invention relates in general to the field of image synthesis.

The present invention applies more particularly to the synthesis of uncaptured intermediate viewpoints, on the basis of images of a plurality of 2D (two-dimensional) views, over 360°, 180°, etc., which are captured in order to generate an immersive video, such as in particular a 360°, 180°, etc., video.

The invention may in particular, but not exclusively, be applied to the video decoding implemented in current AVC (abbreviation for Advanced Video Coding) video decoders and their MVC (abbreviation for Multiview Video Coding) extensions, 3D-AVC, MV-HEVC, 3D-HEVC, etc.

2. PRIOR ART

In a context of immersive video, i.e. in which the viewer has the sensation of being immersed in a 3D (three-dimensional) scene, the scene is conventionally captured by a set of cameras. These cameras may be:
- of 2D type, in order to capture a particular angle of the scene, and/or
- of 360°, 180° or other type, in order to capture all of the scene over 360 degrees, 180 degrees or other about the camera.

The images of such captured views are conventionally coded, and then decoded by the terminal of the viewer. However, in order to deliver an adequate quality of experience, and therefore visual quality and a good degree of immersion, displaying the captured views is not enough. The images of a multitude of views, referred to as intermediate views, have to be calculated, on the basis of the decoded images of the views.

The images of these intermediate views are calculated by means of a view "synthesis" algorithm. A synthesis algorithm is capable, on the basis of the images of N views, with N≥2, of synthesizing an image of an intermediate viewpoint located anywhere in space. The image of a given view from among the N comprises a texture component and a depth map that indicates the distance separating the various elements of the scene from the camera that has captured the image of this view. Thus, the image of an intermediate view obtained by means of synthesis likewise comprises a texture component synthesized on the basis of the N texture components of the images of the N views and a depth map synthesized on the basis of the N depth maps of the images of the N views.

For a given view from among the N, the depth map is either captured or calculated on the basis of the N texture components. However, in both cases, such a depth map may contain numerous errors which are related to the capture, related to the calculation, or related to the compression of the images of the N views.

Such errors therefore inevitably have an impact on the image of a view synthesized on the basis of the image of each of these N views, which notably decreases the performance of current synthesis algorithms.

One well-known synthesis algorithm of the type mentioned above is for example the VSRS (View Synthesis Reference Software) algorithm. This algorithm implements a projection of the N depth maps to a position corresponding to the image of the view to be synthesized in the video to be generated, in order to determine a single synthesized depth map. This depth map is then used to recover the texture information associated with each pixel of the N texture components.

One drawback of this projection lies in the fact that some pixels are missing in the N projected depth maps, since they do not correspond to any of the pixels of the N depth maps before projection. This lack of correspondence may result either from a lack of precision in the pixels contained in the N depth maps used for the projection or because the missing pixels correspond to regions that are not visible in the images of the N views (occlusion) containing the N depth maps.

Such projection errors therefore inevitably have an impact on the image of a view that is synthesized on the basis of the image of each of these N views.

The errors generated in the initial calculation of a depth map are also dependent on the quantization of this information, i.e. on the number of values that this depth map may take, as well as on the level of compression applied, manifesting in the depth map as two types of defects:
- blurring if the errors are small,
- gross defects if these errors are substantial.

As the difference between what the camera that has captured the image of a view can see and what the virtual camera can see increases, synthesis defects become increasingly substantial, and transition from blurring to gross defects, the latter absolutely having to be avoided so as not to negatively affect the sensation of immersion of the viewer.

The techniques of the prior art do not take into account the fact that the available depth maps, intended to be projected in the synthesis of the image of an intermediate view, feature errors. As a result, the depth maps obtained on completion of the projection of the available depth maps also contain errors.

3. AIM AND SUMMARY OF THE INVENTION

One of the aims of the invention is to rectify drawbacks of the aforementioned prior art.

To that end, one subject of the present invention relates to a method for synthesizing an image of a view on the basis of images of N (N≥2) views, implemented by an image synthesis device, characterized in that it comprises the following:
  projecting, to a position corresponding to the image of the view to be synthesized, N depth maps associated with the N views, respectively, such a method being characterized in that it comprises the following:
  for at least one given pixel of at least one projected depth map, for which a depth value has been associated on completion of projection, modifying the depth value of said at least one given pixel if an item of reliability information associated with the depth value is at a certain value, the modification using the depth value of a pixel whose position corresponds to that of said at least one given pixel, in at least one other projected depth map, which generates at least one modified projected depth map.

Taking into account the fact that a conditional modification is applied to one or more projected pixels of at least one of the projected depth maps, the invention advantageously makes it possible to correct errors in said at least one projected depth map. For a given pixel of such a projected depth map, these projection errors may result:

in quantization noises introduced during the digital quantization, over a plurality of bits, of the depth value of each pixel of the depth map of the image of a view, on the basis of which the projected depth map has been obtained, in errors introduced during the compression of the depth map by means of a coder of HEVC, 3D-HEVC, etc. type, in errors introduced during the projection of the depth map of the image of the view into real space.

All of the pixels of a projected depth map are not mandatorily modified. They are modified if an item of reliability information, assigned to each of these pixels, is at a certain value.

Additionally, such a modification uses the depth value of a pixel whose position corresponds to that of a given pixel, in another projected depth map, such a depth value being considered relevant for correcting the erroneous depth value of the given pixel.

Thus, by virtue of the invention, a given projected depth map is marred by many fewer errors than a projected depth map of the prior art. This results in a very clear improvement in the quality of the image of a view synthesized on the basis of a plurality of images of views, when at least one of these images is associated with a depth map that contains errors before and/or after projection.

According to one embodiment of the invention, the modification uses a weighting of the depth value of the pixel whose position corresponds to said at least one given pixel, in said at least one other projected depth map.

Such an embodiment make it possible to assign a higher or lower importance to a pixel whose position corresponds to that of the given pixel, in another projected depth map, which will, as a result, have a larger or smaller effect on the modification of the depth value of the given pixel.

According to one embodiment of the invention, the confidence level of a pixel of a given depth map is calculated as a variation in the depth value of said pixel, said variation corresponding to a projection error in terms of allowed number of pixels.

Such a calculation of the confidence level advantageously makes it possible to take into account the real projection quality of said at least one other depth map, in addition to the positioning distance between the camera that has captured the image of the view, for which the projection of the depth map has generated the given projected depth map, and the camera that has captured the image of said at least one other view, for which the projection of the depth map has generated the other projected depth map.

According to one embodiment of the invention, the confidence level of a pixel is weighted by a coding parameter of the image of the view with which the depth map that contains the pixel is associated.

Such an embodiment makes it possible to refine the calculation of the confidence level of a given pixel by taking into account the compression quality level, such as, for example, the value of the quantization step that has been used during the coding of the image of the view with which the depth map that contain said pixel is associated, or else the position of this image in the coding hierarchy.

According to one embodiment of the invention, the modification of the depth value of the given pixel consists in replacing said depth value with a value that is calculated on the basis of said depth value and of the depth value of the pixel whose position corresponds to that of said at least one given pixel in said at least one other projected depth map, said depth values each being weighted by their respective confidence level.

According to one embodiment of the invention, the item of reliability information is generated as follows:

determining, in the set of N projected depth maps, for one and the same position as that of the given pixel, which pixel has the maximum depth value and which pixel has the minimum depth value, calculating the difference between the maximum and minimum depth values, comparing the calculated difference with a threshold, generating an item of reliability information, the value of which is dependent on the result of the comparison.

According to one embodiment of the invention, the item of reliability information is advantageously calculated in such a way that the modification that is applied to the value of the given pixel of the given depth map and that is conditional on this item of reliability information results only in blur-type artefacts in the image of the synthesized view.

According to one embodiment of the invention, the item of reliability information is generated as follows:

determining, in the set of N projected depth maps, for one and the same position as that of the given pixel, which pixel has the maximum depth value and which pixel has the minimum depth value, calculating a difference between the depth value of said given pixel and the determined minimum depth value, comparing the calculated difference with a threshold, generating an item of reliability information with respect to the determined minimum depth value, the value of which is dependent on the result of the comparison, calculating another difference between the determined maximum depth value and the depth value of said given pixel, comparing the other calculated difference with said threshold, generating an item of reliability information with respect to the determined maximum depth value, the value of which is dependent on the result of the comparison.

According to one embodiment, the item of reliability information for a given pixel of a given projected depth map is advantageously quantized over two levels:

a first level that takes into account the difference between the depth value of the given pixel in the projected depth map and the minimum depth value determined for the N projected depth maps, for the N pixels whose position corresponds to that of the given pixel, a second level that takes into account the difference between the maximum depth value determined for the N projected depth maps, for the N pixels whose position corresponds to that of the given pixel, and the depth value of the given pixel in the projected depth map.

In this way, for a given pixel of a projected depth map, according to the two items of reliability information associated with the given pixel, the respective depth values of the pixels whose position corresponds to that of the given pixel in the N projected depth maps may be selected in two different ways to modify the depth value of the given pixel. The modification of the depth value of the given pixel is thus made more precise.

According to one embodiment of the invention, the comparison threshold is equal to the mean of the N variations in the depth value of each pixel whose position corresponds to that of said given pixel in their respective depth map.

Such an embodiment for calculating the comparison threshold make it possible to optimize the decrease in blur-type artefacts in the image of the synthesized view.

According to one embodiment of the invention, the comparison threshold is equal to the mean of the N variances in the depth value of each pixel whose position corresponds to that of said given pixel in their respective depth map.

Such an embodiment for calculating the comparison threshold makes it possible to optimize the decrease in blur-type artefacts in the image of the synthesized view, while taking into account the intrinsic quality of the N projected depth maps.

The various abovementioned embodiments or implementation features may be added, independently or in combination with one another, to the synthesis method defined above.

The invention also relates to a device for synthesizing an image of a view on the basis of images of N (N≥2) views, such a synthesis device being characterized in that it comprises a processor that is configured to implement the following:
- projecting, to a position corresponding to the image of the view to be synthesized, N depth maps associated with the N views, respectively,
- for at least one given pixel of at least one projected depth map, for which a depth value has been associated on completion of projection, modifying the depth value of said at least one given pixel if an item of reliability information associated with said depth value is at a certain value, said modification using the depth value of a pixel whose position corresponds to that of said at least one given pixel, in at least one other projected depth map, which generates at least one modified projected depth map.

Such a synthesis device is notably capable of implementing the aforementioned synthesis method, according to any one of its aforementioned embodiments.

The invention also relates to a method for decoding a data signal representative of a set of images of N (N≥2) coded views, comprising the following:
- decoding the images of the N coded views, producing a set of images of N decoded views,
- synthesizing an image of a view on the basis of the set of images of N decoded views in accordance with the aforementioned synthesis method, according to any one of the aforementioned embodiments.

The invention also relates to a device for decoding a data signal representative of a set of images of N (N≥2) coded views, such a decoding device comprising a processor that is configured to implement the following:
- decoding the images of the N coded views, producing a set of images of N decoded views,
- synthesizing an image of a view on the basis of said set of images of N decoded views in accordance with the aforementioned synthesis method, according to any one of the aforementioned embodiments.

The invention also relates to a computer program comprising instructions for implementing the synthesis method or the decoding method integrating the synthesis method according to the invention, according to any one of the particular embodiments described above, when said program is executed by a processor.

This program can use any programming language, and be in the form of source code, object code, or of code intermediate between source code and object code, such as in a partially compiled form, or in any other desirable form.

The invention also targets a recording medium or information medium that is readable by a computer, and comprises instructions of a computer program, such as mentioned above.

The recording medium may be any entity or device capable of storing the program. For example, the medium may comprise a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from an Internet-type network.

Alternatively, the recording medium may be an integrated circuit in which the program is incorporated, the circuit being adapted to execute or to be used in the execution of the aforementioned synthesis or decoding method.

4. BRIEF DESCRIPTION OF THE DRAWINGS

Figure 2:
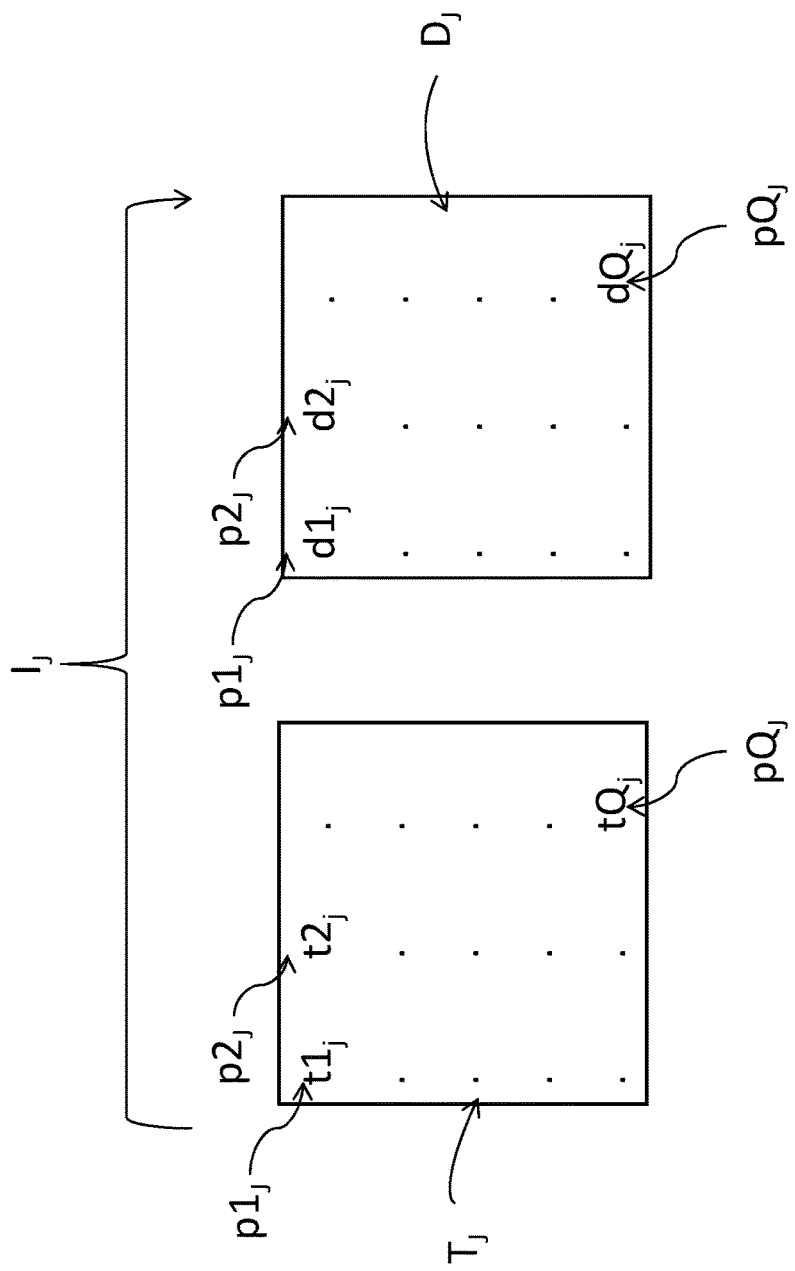
Figure 3:
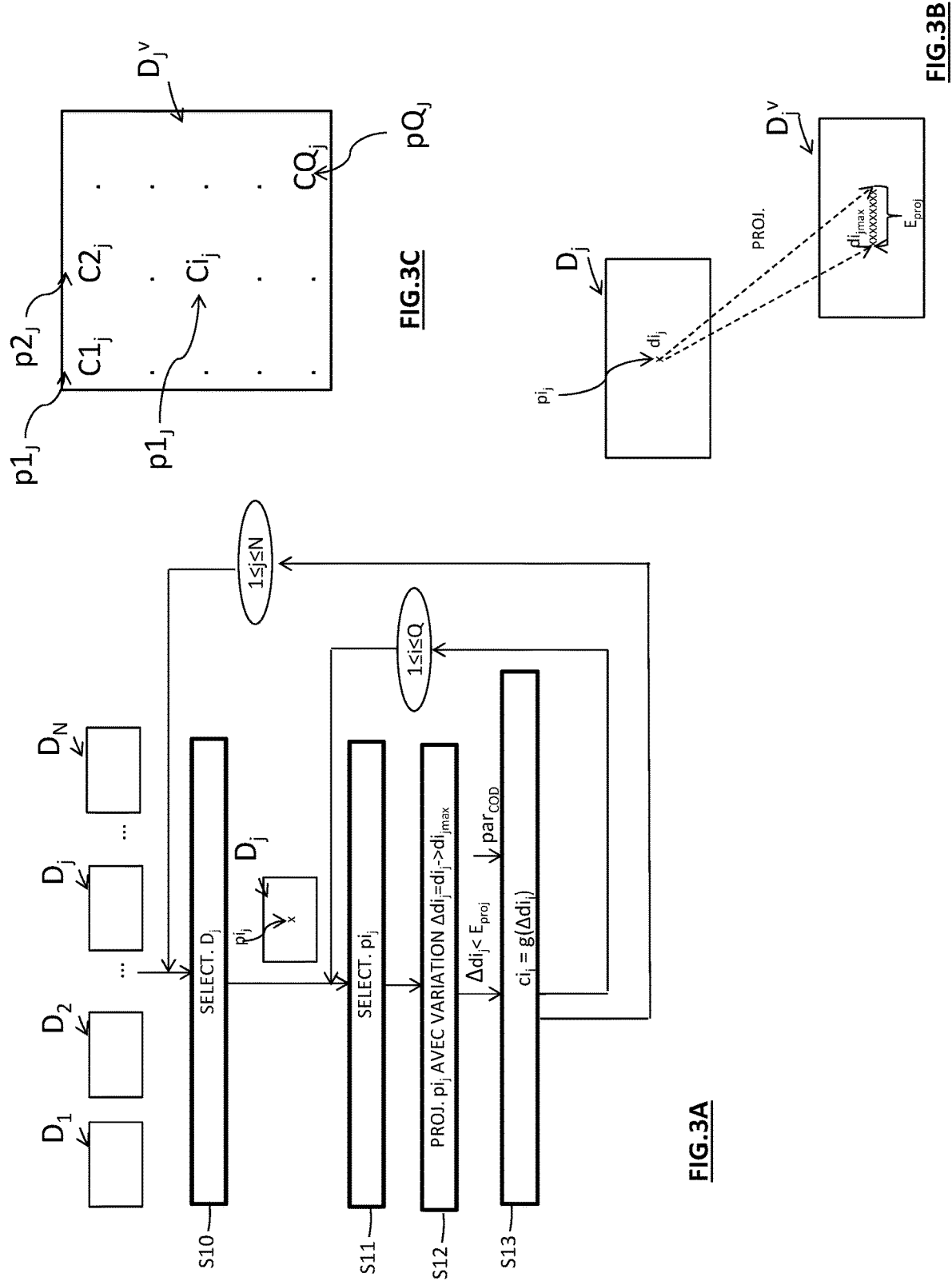
Figure 4:
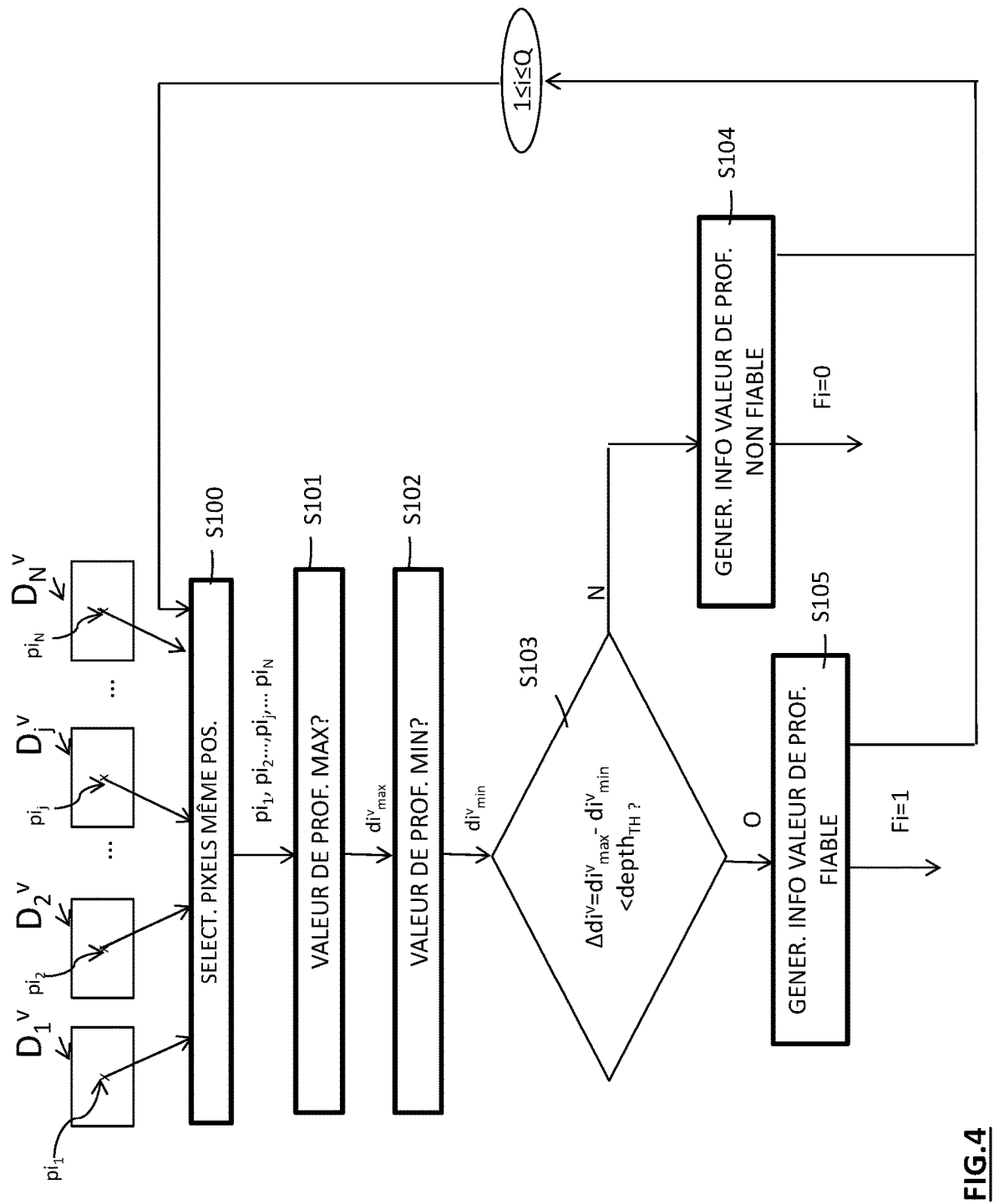
Figure 6A:
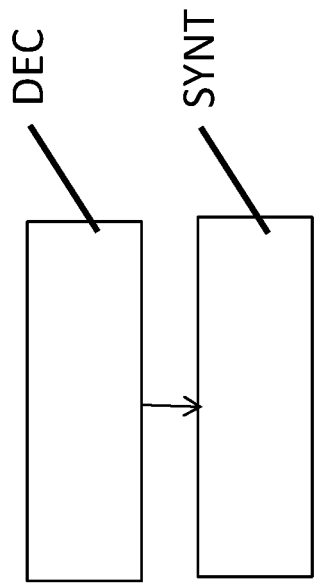
Figure 6B:
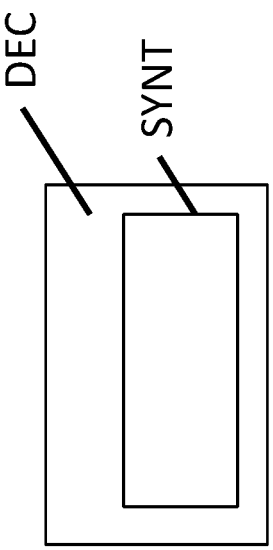
Figure 5:
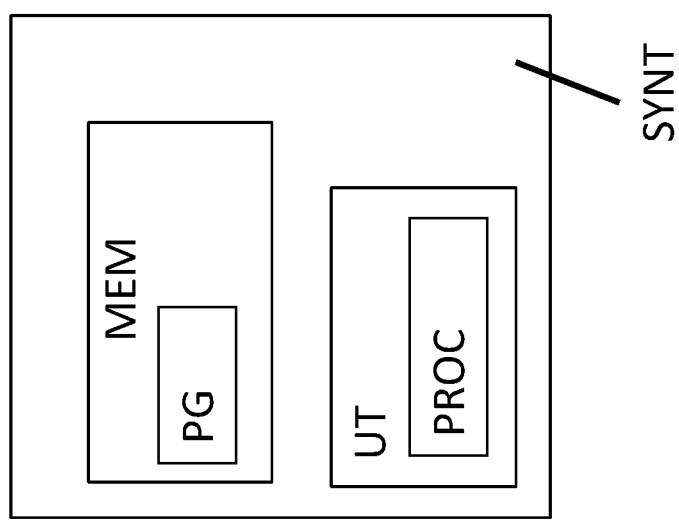

Other features and advantages will become more clearly apparent from reading several preferred embodiments, given purely by way of illustrative and non-limiting examples, and described below with reference to the appended drawings, in which:

FIG. 1 shows the main actions performed by the synthesis method according to one embodiment of the invention, FIG. 2 shows an exemplary image used in the synthesis method of FIG. 1, FIGS. 3A to 3C show an exemplary calculation of a confidence level used in the synthesis method of FIG. 1, FIG. 4 shows an exemplary calculation of an item of reliability information used in the synthesis method of FIG. 1, FIG. 5 shows a synthesis device implementing the synthesis method of FIG. 1, FIGS. 6A and 6B show exemplary arrangements of the synthesis device of FIG. 5, in the case where the images being used for the image synthesis have been decoded beforehand.

5. DESCRIPTION OF THE GENERAL PRINCIPLE OF THE INVENTION

The invention primarily proposes a scheme for synthesizing an image of an intermediate view on the basis of a plurality of images of, respectively, a plurality of views, each view representing, at the current time, a 3D scene according to a given position or a given viewing angle.

For each image of a view in the plurality of images, the depth map of the image of the view is projected conventionally to a position corresponding to the image of a view to be synthesized.

The invention is characterized by the application of a conditional modification of the depth value of each given pixel in a given projected depth map. Such a modification makes it possible to compensate for the errors in the depth values which may be due to:

errors introduced during the calculation of the depth values of the depth map of the image of a view, on the basis of which the given projected depth map has been obtained, errors introduced during the compression of data of the image of the view, errors introduced during the projection of the depth map of the image of the view into real space.

6. EXEMPLARY SYNTHESIS SCHEME IMPLEMENTATIONS

A method for synthesizing an image of a view on the basis of images of a plurality of views is described hereinafter, such a method being able to be used in or with any type of current video decoders AVC and HEVC and their extensions (MVC, 3D-AVC, MV-HEVC, 3D-HEVC, etc.), inter alia.

With reference to FIG. 1, such a synthesis method uses N images $I_1, I_2, \ldots, I_j, \ldots, I_N$ of N views, respectively, with $1 \leq j \leq N$ and $N \geq 2$, the plurality of views representing a 3D scene according to, respectively, a plurality of viewing angles or a plurality of positions/orientations. Conventionally:

the image $I_1$ comprises a texture component $T_1$ and a depth map $D_1$, the image $I_2$ comprises a texture component $T_2$ and a depth map $D_2$,

..., the image $I_j$ comprises a texture component $T_j$ and a depth map $D_j$,

..., the image $I_N$ comprises a texture component $T_N$ and a depth map $D_N$.

For a given image $I_j$, as shown in FIG. 2:

its texture component $T_j$ comprises Q ($Q \geq 1$) points $p1_j$, $p2_j, \ldots, pQ_j$ each assigned a corresponding texture value $t1_j, t2_j, \ldots, tQ_j$, its depth map $D_j$ comprises the Q points $p1_j, p2_j, \ldots, pQ_j$ each assigned a corresponding depth value $d1_j$, $d2_j, \ldots, dQ_j$.

In S1 in FIG. 1, the depth maps $D_1, D_2, \ldots, D_j, \ldots, D_N$ are projected to a position corresponding to an image $I_{sth}$ of a view to be synthesized.

Such a projection is implemented by a projection algorithm, for example of DIBR (abbreviation for Depth Image Based Rendering) type.

On completion of such a projection, N projected depth maps $D_1^v, D_2^b, \ldots, D_j^v, \ldots, D_N^v$ are obtained. A given depth map $D_j$ from among the N comprises the Q points $p1_j$, $p2_j, \ldots, pQ_j$ each assigned a corresponding depth value $d1^v_j$, $d2^v_j, \ldots, dQ^v_j$.

Such depth values are not systematically correct given in particular:

quantization noise introduced during the digital quantization over a plurality of bits of each of the depth values $d1_j, d2_j, \ldots, dQ_j$, and/or in the case where the depth map $D_j$ has undergone compression by a coder of HEVC, 3D-HEVC, etc. type, errors introduced during this compression, and/or errors introduced during the projection of the depth map $D_j$ into real space.

In a manner known per se, the N projected depth maps $D_1^v, D_2^v, \ldots, D_j^v, \ldots, D_N^v$ are associated, respectively, with N attribute maps $A_1, A_2, \ldots, A_j, \ldots, A_N$.

For any given projected depth map $D_j^v$ ($1 \leq j \leq N$), an attribute map indicates for each point/pixel $p1_j$ to $pQ_j$ of the depth map $D_j$, whether their projection is valid or not.

In the case for example of the point $p1_j$ of the depth map $D_j$:

an attribute value $A1_j = V1$ is associated with the point $p1_j$ of the projected depth map $D_j^v$ to indicate that no depth value has been assigned to the point $p1_j$, an attribute value $A1_j = V2$ is associated with the point $p1_j$ of the projected depth map $D_j^v$ to indicate that a depth value has been assigned to the point $p1_j$.

The absence of a depth value attributed to a point/pixel of a projected depth map may occur during the projection S1 of this depth map, on completion of which no depth value could be assigned to the point resulting from the projection. This point without an associated depth value then constitutes a "hole" region.

In this example, each attribute value of an attribute map $A_1, A_2, \ldots, A_j, \ldots, A_N$ is binary. To that end, $V1=0$ and $V2=1$ or vice versa. According to another example, the values of an attribute map $A_1, A_2, \ldots, A_j, \ldots, A_N$ are integers within the range $[0, +\infty]$.

In S2, in FIG. 1, for at least one given projected depth map $D_j^v$, a conditional modification is applied to the depth values $d1^v_j, d2^v_j, \ldots, dQ^v_j$.

Such a conditional modification takes place as follows.

In S21, for a given pixel $pi_j$ ($1 \leq i \leq Q$) of the projected depth map $D_j^v$, it is determined whether the attribute $Ai_j$ associated with the pixel $pi_j$ is at a first value V1 or at a second value V2.

If the attribute $Ai_j$ has a value of V1, the conditional modification method is not implemented and the following pixel of the projected depth map $D_j^v$ is then considered.

If the attribute $Ai_j$ has a value of V2, in S22, it is determined whether an item of reliability information $Fi_j$, associated with the pixel $pi_j$, is at a first value V3 or at a second value V4.

According to one non-exhaustive exemplary embodiment, $V3=0$ and $V4=1$ or vice versa.

If the item of reliability information $Fi_j$ is at the first value V3, the depth value $di^v_j$ of the pixel $pi_j$ of the projected depth map $D_j^v$ is not modified.

If the item of reliability information $Fi_j$ is at the second value V4, the depth value $di^v_j$ of the pixel $pi_j$ of the projected depth map $D_j^v$ is modified in S23. According to the invention, the depth value $di^v_j$ is modified according to a depth value of a pixel located in the same position as that of the pixel $pi_j$, in at least one other projected depth map $D_1^v$, $D_2^v, \ldots, D_N^v$. Thus, the depth value is modified according to:

the depth value $di^v_1$ associated with the pixel $pi_1$ of the projected depth map $D_1^v$, and/or, the depth value $di^v_2$ associated with the pixel $pi_2$ of the projected depth map $D_2^v$, if the depth value $di^v_2$ exists ($Ai_2 = V2$) and/or,

..., the depth value $di^v_N$ associated with the pixel $pi_N$ of the projected depth map $D_N^v$ if the depth value $di^v_N$ exists ($Ai_N = V2$).

According to the invention, the modification S23 uses a weighting of the depth values $d1^v_j, d2^v_j, \ldots, dQ^v_j$. Thus:

the depth value $di^v_1$ is weighted by a coefficient $Ci_1$, the depth value $di^v_2$ is weighted by a coefficient $Ci_2$,

..., the depth value $di^v_N$ is weighted by a coefficient $Ci_N$.

As will be described further below in the description:

the coefficient $Ci_1$ corresponds to a confidence level that has been attributed to the depth value $di^v_1$ of the pixel $pi_1$ of the projected depth map $D^v_1$, the coefficient $Ci_2$ corresponds to a confidence level that has been attributed to the depth value $di^v_2$ of the pixel $pi_2$ of the projected depth map $D^v_2$,

..., the coefficient $Ci_N$ correspond to a confidence level that has been attributed to the depth value $di^v_N$ of the pixel $pi_N$ of the projected depth map $D^v_N$.

Of course, a confidence level is attributed only if the given pixel in a given projected depth map has a depth value that corresponds to that of the pixel whose position is the same in the corresponding depth map yet to be projected.

On completion of the modification S23, a modified depth value $\overline{d1_j^v}$ of the pixel $pi_j$ of the projected depth map $D_j^v$ is obtained according to the following relationship:

$\overline{dl_j^v}$=fonction $((Ci_1, di^v_1), (Ci_2, di^v_2), \ldots, (Ci_N, di^v_N))$, on condition that $Ai_1$=V2, $Ai_2$=V2, ..., $Ai_N$=V2.

The conditional modification S2 described above is applied to the depth value of each of the pixels $p1_j$, $p2_j, \ldots, pQ_j$ of the projected depth map $Dj^v$ and is iterated for all of the projected depth maps $D_1^v$ to $D_N^v$.

On completion of the conditional modification S2, the following are obtained:

at least one modified projected depth map $\overline{D_j^v}$, an unmodified projected depth map $D_1^v$ or a modified projected depth map $\overline{D_1^v}$, an unmodified projected depth map $D_2^v$ or a modified projected depth map $\overline{D_2^v}$,

..., an unmodified projected depth map $D_N^v$ or a modified projected depth map $\overline{D_N^v}$.

In a manner known per se, in S3, the depth maps $D_1^v$ or $\overline{D_1^v}$, $D_2^v$ or $\overline{D_2^v}$, ..., $D_j^v$, ..., $D_N^v$ or $\overline{D_N^v}$ are interpolated with the texture components $T_1, T_2, \ldots, T_N$, respectively, for example using a texture backward warping algorithm, delivering an image $I_{sth}$ of a synthesized view.

The image synthesis method applies equally to uncoded, coded or decoded images $I_1$ to $I_N$. In the case where the images $I_1$ to $I_N$ have been decoded, the synthesis method may form part of the decoding method and be implemented by the decoder, or else be implemented in a synthesis device placed at the output of the decoder.

One embodiment of the calculation of the confidence level mentioned above will now be described, with reference to FIGS. 3A and 3B.

All of the depth maps $D_1$ to $D_N$ are considered.

In S10, a depth map is selected, for example the depth map $D_j$.

In S11, a pixel $pi_j$ of the depth map $D_j$ is selected.

In S12, the pixel $pi_j$ is projected on the projected depth map $D_j^v$, in a position identical to that of the pixel $pi_j$ in the depth map $D_j$. During the projection S12, a variation of the depth value $di_j$ of the pixel $pi_j$ is carried out until reaching a maximum depth value $di_{jmax}$, such that:

$\Delta di_j = di_{jmax} - di_j < E_{proj}$ where $E_{proj}$ is an allowed projection error of the pixel $pi_j$ on the projected depth map $D_j^v$.

According to one exemplary embodiment, $E_{proj}$ is the projection deviation of the pixel $pi_j$ in number of pixels, for example 3 pixels.

In S13, the confidence level $Ci_j$ is calculated according to the relationship:

$Ci_j = g(\Delta di_j)$ where g represents a predefined mathematical function, such as for example a power function or an exponential function.

The application of a function to $\Delta di_j$ thus makes it possible to give greater importance to the depth map located closest to the view to be synthesized.

Operations S11 to S13 are applied to all of the pixels of the selected depth map $D_j$ so as to attribute a respective confidence level $C1_j, C2_j, \ldots, CQ_j$ to each of these pixels.

On completion of these operations, with reference to FIG. 3C, a map $Ci_j$ of confidence levels is attributed in relation to the projected depth map $D_j^v$.

All of operations S10 to S13 are then applied to each of the depth maps $D_1$ to $D_N$.

According to one embodiment, in the case where the images $I_1$ to $I_N$ have been coded, the calculation of a confidence level $Ci_j$ is also dependent on at least one coding parameter $par_{COMP}$ associated with the image $I_j$. Such a coding parameter is for example the value of the quantization step that was used during the coding of the image $I_j$, or the position of this image in the coding hierarchy.

More generally, the calculation of the confidence level $Ci_j$ may take into account all of the parameters of the image $I_j$ (intrinsic and extrinsic parameters), apart from the texture, namely:

the real quality of the projection and not only the positioning distance between two cameras that each capture a given image from among the N images $I_1$ to $I_N$, the digital quantization level: a depth map quantized on 8 bits, in which only a quarter of the dynamic range is therefore used, has a confidence level that is lower than the confidence level of this depth map quantized on 32 bits, since the variation in depth $\Delta di_j$ giving a displacement by 3 pixels will be smaller, the one or more compression parameters of the image $I_j$ (quantization step, temporal structure), the intrinsic quality the depth map $D_j$, i.e. a small deviation between the depth value at each point/pixel of the depth map $D_j$ and the real depth value at each corresponding point in the 3D scene, the importance given to the depth map $D_j$, linked to the position of the image $I_j$ with respect to the image $I_{sth}$ to be synthesized.

One embodiment of a calculation of the item of reliability information mentioned above will now be described with reference to FIG. 4.

All of the projected depth maps $D_1^v$ à $D_N^b$ are considered.

In S100, the pixels $p1_1, p1_2, \ldots, p1_N$ that are located in the same position (the first pixel of the first row from the left), in each of the projected depth maps $D_1^v, D_2^v, \ldots, D_j^v, \ldots, D_N^v$ are selected.

In S101, it is determined which pixel, from among the pixels $p1_1, p1_2, \ldots, p1_N$, has the maximum depth value $d1^v_{max}$.

In S102, it is determined which pixel, from among the pixels $p1_1, p1_2, \ldots, p1_N$, has the minimum depth value $d1^v_{min}$.

During operations S101 and S102, if no depth value has been found in relation to a given pixel in a projected depth map, this projected depth map is not considered. As already explained above, the absence of depth value may occur during the projection S1 (FIG. 1) of each depth map $D_1$ à $D_N$, on completion of which all of the pixels of the synthesized image lath are not necessarily associated with a depth value. These pixels without an associated depth value constitute "hole" regions.

In S103, the difference $\Delta d1^v = d1^v_{max} - d1^v_{min}$ is compared with a predefined threshold $depth_{TH}$.

If $\Delta d1^v = d1^v_{max} - d1^v_{min} \geq depth_{TH}$, in S104, an item of reliability information F1 is set to a first value V3, such that for example V3=0, to indicate that the depth value of the pixels $p1_1, p1_2, \ldots, p1_N$ which have been projected to the same position, respectively in the projected depth maps $D_1^v, D_2^v, \ldots, D_j^v, \ldots, D_N^b$, is not reliable.

As a variant, the comparison S104 is $\Delta d1^v = d1^v_{max} - d1^v_{min} > depth_{TH}$.

If $\Delta d1^v = d1^v_{max} - d1^v_{min} < depth_{TH}$, in S105, an item of reliability information F1 is set to a second value V4, such that for example V4=1, to indicate that the depth value of the pixels $p1_1, p1_2, \ldots, p1_N$ which have been projected to the same position, respectively in the projected depth maps $D_1^v, D_2^v, \ldots, D_j^v, \ldots, D_N^v$, is reliable.

As a variant, the comparison S105 is $\Delta d1^v = d1^v_{max} - d1^v_{min} \leq depth_{TH}$.

The threshold $depth_{TH}$ is a threshold for differentiating between the foreground and the background of the 3D scene. The threshold $depth_{TH}$ is dependent for example on the variations in depth value $\Delta d1_1, \Delta d1_2, \ldots, \Delta d1_j, \ldots, \Delta d1_N$ that were calculated in S12 (FIG. 3A) to generate the confidence level $C1_1$ of the pixel $p1_1$, the confidence level $C1_2$ of the pixel $p1_2, \ldots$, the confidence level $C1_j$ of the pixel $p1_j, \ldots$, the confidence level $C1_N$ of the pixel $p1_N$.

According to one particular example, $$depth_{TH} = \frac{\sum_{j=1}^{N} \Delta d1_j}{N}$$

According to another particular example, $$depth_{TH} = \sqrt{\frac{\sum_{y=0}^{height} \sum_{x=0}^{width} \sum_{j=1}^{N} (D_j^v(x,y) - \overline{D^v}(x,y))^2}{(width) * (height)}}$$

with $$\overline{D^V}(x,y) = \frac{\sum_{j=1}^{N} D_j^v(x,y)}{N}$$

where (x, y) are the coordinates of the pixels/points of each depth map.

Operations S100 to S103 and S104 or S105 are iterated for the pixels $p2_1, p2_2, \ldots, p2_N$ that are located in the same position (for example the second pixel of the first row from the left), in each of the projected depth maps $D_1^v, D_2^v, \ldots, D_j^v, \ldots, D_N^v$, and so on up to the pixels $pQ_1, pQ_2, \ldots, pQ_N$ that are located in the same position (for example the last pixel of the last row from the left), in each of the projected depth maps $D_1^v, D_2^v, \ldots, D_j^v, \ldots, D_N^v$.

7. PARTICULAR EMBODIMENTS OF THE SYNTHESIS METHOD

Three embodiments of the synthesis method described above will now be described.

According to these three embodiments, an image 1st of a synthesized view is obtained on the basis of images $I_1, I_2, I_3, I_4$ of four views, respectively.

With reference to FIG. 1, the depth maps $D_1, D_2, D_3, D_4$ of each image $I_1, I_2, I_3, I_4$, respectively, are projected, in S1, to a position corresponding to an image $I_{sth}$ of a view to be synthesized. Four projected depth maps $D_1^v, D_2^v, D_3^v, D_4^v$ are then obtained.

The following are provided as input to the synthesis method:
- the four projected depth maps $D_1^v, D_2^v, D_3^v, D_4^v$ obtained in S1,
- the corresponding four attribute maps $A_1, A_2, A_3, A_4$ obtained in S1,
- the predefined threshold $depth_{TH}$.

7.1 First Embodiment

In order to implement the conditional modification operation S2 of FIG. 1, the method performs the calculation, at each pixel of each of the projected depth maps $D_1^v, D_2^v, D_4^v$, of its respective confidence level, as illustrated in FIG. 3A.

All of the depth maps $D_1$ to $D_4$ are considered.

In S10, a depth map is selected, for example the depth map $D_1$.

In S11, a pixel $pi_1$ of the depth map $D_1$ is selected.

In S12, the pixel $pi_1$ is projected on the projected depth map $D_1^v$, in a position identical to that of the pixel $pi_1$ of the depth map $D_1$. During the projection S12, a variation of the depth value $di_1$ of the pixel $pi_1$ is carried out until reaching a maximum depth value $di_{1max}$, such that:

$$\Delta di_1 = di_{1max} - di_{1s} E_{proj}$$

where $E_{proj}$ is an allowed projection error of the pixel $pi_1$ on the projected depth map $D_1^v$.

According to one preferred exemplary embodiment, $E_{proj}$ is the projection deviation of the pixel $pi_1$ in number of pixels, for example 3 pixels. It is considered that an error of 3 pixels at most primarily results in blur-type artefacts.

The calculation of $\Delta di_1$ is iterative. To that end, the depth value $di_1$ is increased up to the depth value $di_{1max}$, for which a projection deviation $E_{proj}$ of 3 pixels is obtained.

In S13, the confidence level $Ci_1$ is calculated according to the relationship $Ci_1 = (\Delta di_1)^2$ to give greater importance to the image of the view closest to the image $I_{sth}$ of the view to be synthesized.

Operations S11 to S13 are applied to all of the pixels of the selected depth map $D_1$ so as to attribute a respective confidence level $C1_1, C2_1, \ldots, CQ_1$ to each of these pixels.

All of operations S10 to S13 are then applied to each of the depth maps $D_2, D_3, D_4$.

The calculation of such a confidence level takes into account all of the parameters of an image of a view (texture aside), i.e. the real quality of the projection of its depth map, the quantization level of this image, and not only the positioning distance between two cameras that have captured two images from among the images $I_1$ to $I_4$.

The calculation of such a confidence level may also take as input data from a video coder, like for example a quantization step.

In order to implement the conditional modification operation S2 of FIG. 1, the method also performs the calculation of the item of reliability information, at each pixel of each of the projected depth maps $D_1^v, D_2^v, D_3^v, D_4^v$, as illustrated in FIG. 4.

All of the projected depth maps $D_1^v$ to $D_4^v$ are considered.

In S100, the pixels $p1_1, p1_2, \ldots, p1_N$ that are located in the same position (the first pixel of the first row from the left), in each of the projected depth maps $D_1^v, D_2^v, D_3^v, D_4^v$ are selected.

In S101, it is determined which pixel, from among the four pixels $p1_1$, $p1_2$, $p1_3$, $p1_4$, has the maximum depth value $d1^v_{max}$.

According to the first embodiment:

$d1^v_{max}$=Max (($A1_1$, $D_1^v$), ($A1_2$, $D_2^v$), ($A1_3$, $D_3^v$), ($A1_4$, $D_4^v$))

In S102, it is determined which pixel, from among the four pixels $p1_1$, $p1_2$, $p1_3$, $p1_4$, has the minimum depth value $d1^v_{min}$.

According to the first embodiment:

$d1^v_{min}$=Min (($A1_1$, $D_1^v$), ($A1_2$, $D_2^b$), ($A1_3$, $D_3^v$), ($A1_4$, $D_4^v$))

In operations S101 and S102, $A1_1$ is the attribute relating to the projection of the pixel $p1_1$ in the projected depth map $D_1^v$, $A1_2$ is the attribute relating to the projection of the pixel $p1_2$ in the projected depth map $D_2^v$, $A1_3$ is the attribute relating to the projection of the pixel $p1_3$ in the projected depth map $D_3^v$, $A1_4$ is the attribute relating to the projection of the pixel $p1_4$ in the projected depth map $D_4^v$, and by considering that:

$A1_1$=V1 or $A1_1$=V2, and/or
$A1_2$=V1 or $A1_2$=V2, and/or
$A1_3$=V1 or $A1_3$=V2 and/or
$A1_4$=V1 or $A1_4$=V2, knowing that if $A1_1$=V1 (or $A1_2$=V1, $A1_3$=V1, $A1_4$=V1), no depth value of the pixel $p1_1$ (or $p1_2$, $p1_3$, $p1_4$) has been projected on the projected depth map $D_1^v$ (or $D_2^v$, $D_3^v$, $D_4^v$) and that therefore this value does not occur in the calculation of the maximum depth value $d1^v_{max}$ or of the minimum depth value $d1^v_{min}$.

In S103, the difference $\Delta d1^v = d1^v_{max} - d1^v_{min}$ is compared with a predefined threshold $depth_{TH}$, according to the following relationship:

$$\Delta d1^v = d1^v_{max} - d1^v_{min} < depth_{TH}$$

with $$depth_{TH} = \frac{\sum_{j=1}^{4} \Delta d1_j}{4}$$

If $\Delta d1^v = d1^v_{max} - d1^v_{min} \geq depth_{TH}$, in S104, an item of reliability information $F_1$ is set to a first value V3, such that for example V3=0, to indicate that the depth value of the pixels $p1_1$, $p1_2$, $p1_3$, $p1_4$ which have been projected to the same position, respectively in the 4 projected depth maps $D_1^v$, $D_2^v$, $D_3^v$, $D_4^v$, is not reliable.

If $\Delta d1^v = d1^v_{max} - d1^v_{min} < depth_{TH}$, in S105, an item of reliability information $F_1$ is set to a second value V4, such that for example V4=1, to indicate that the depth value of the pixels $p1_1$, $p1_2$, $p1_3$, $p1_4$ which have been projected to the same position, respectively in the 4 projected depth maps $D_1^v$, $D_2^v$, $D_3^v$, $D_4^v$, is reliable.

Operations S100 to S103 and S104 or S105 are iterated for the pixels $p2_1$, $p2_2$, ..., $p2_N$ that are located in the same position (for example the second pixel of the first row from the left), in each of the projected depth maps $D_1^v$, $D_2^v$, $D_3^v$, $D_4^v$, and so on up to the pixels $pQ_1$, $pQ_2$, ..., $pQ_N$ that are located in the same position (for example the last pixel of the last row from the left), in each of the projected depth maps $D_1^v$, $D_2^v$, $D_3^v$, $D_4^v$.

With reference to the FIG. 1, for at least one given projected depth map $D_j^v$, a conditional modification S2 is applied to the depth values $d1^v_j$, $d2^v_j$, ..., $dQ^v_j$.

Such a conditional modification S2 takes place as follows.

In S21, for a given pixel $pi_1$ ($1 \leq i \leq Q$) of the projected depth map $D_1^v$, it is determined whether the attribute $Ai_1$ associated with the pixel $pi_1$ is at a first value V1 or at a second value V2.

If the attribute $Ai_1$ has a value of V1, the conditional modification method is not implemented and the following pixel of the projected depth map $D_1^v$ is then considered.

If the attribute $Ai_1$ has a value of V2, in S22, it is determined whether an item of reliability information $Fi_1$, associated with the pixel $pi_1$, is at a first value V3 or at a second value V4.

If $Fi_1$=V3, the depth value $di^v_1$ of the pixel $pi_1$ of the projected depth map $D_1^v$ is not modified.

If $Fi_1$=V4, the depth value $di^v_1$ of the pixel $pi_1$ of the projected depth map $D_1^v$ is modified in S23.

According to the first embodiment, on completion of the modification S23, a modified depth value $\overline{di_1^v}$ of the pixel $pi_1$ of the projected depth map $D_1^v$ is obtained according to the following relationship:

$$\overline{di_1^v} = \frac{\sum_{j=1}^{4}(Ci_j * di_j^v)}{\sum_{j=1}^{4}(Ci_j)}$$

The conditional modification S2 described above is applied to the depth value of each of the pixels $p1_j$, $p2_j$, ..., $pQ_j$ of the projected depth map $D_1^v$ and is iterated for each pixel of each of the other projected depth maps $D_2^v$, $D_3^v$, $D_4^v$.

7.2 Second Embodiment

According to this second embodiment, the calculation of the confidence level takes place in the same way as in the first embodiment.

The calculation of the reliability information takes place in the same way as in the first embodiment up to and including S102.

The following calculation is then performed:

The pixels $p1_1$, $p1_2$, ..., $p1_N$ that are located in the same position (the first pixel of the first row from the left), in each of the projected depth maps $D_1^v$, $D_2^v$, $D_3^v$, $D_4^v$.

The calculation of the mean variance $Var_{moy}$ of the corresponding projected depth values $d1^v_1$, $d1^v_2$, $d1^v_3$, $d1^v_4$ is performed.

If $Var_{moy} > depth_{TH}$, in S103, the difference $\Delta d1^v = d1^v_{max} - d1^v_{min}$ is compared with a predefined threshold, according to the following relationship:

$$\Delta d1^v = d1^v_{max} - d1^v_{min} < Var_{moy}$$

Operations S104 or S105 of FIG. 4 take place in the same way as in the first embodiment.

Operations S100 to S103 and S104 or S105 are iterated for the pixels $p2_1$, $p2_2$, ..., $p2_N$ that are located in the same position (for example the second pixel of the first row from the left), in each of the projected depth maps $D_1^v$, $D_2^v$, $D_3^v$, $D_4^v$, and so on up to the pixels $pQ_1$, $pQ_2$, ..., $pQ_N$ that are located in the same position (for example the last pixel of the last row from the left), in each of the projected depth maps $D_1^v$, $D_2^v$, $D_3^v$, $D_4^v$.

The conditional modification S2 is implemented in the same way as in the first embodiment.

7.3 Third Embodiment

According to this third embodiment, the calculation of the confidence level takes place in the same way as in the first embodiment.

The calculation of the reliability information takes place in the same way as in the first embodiment up to and including S102. Operations S103 to S104 or S105 are replaced by the following:

In the case of the pixel $p1_1$ of the projected depth map $D_1^v$, the differences $d1_1^v - d1_{min}^v$ and $d1_{max}^v - d1_1^v$ are each compared with a predefined threshold $depth_{TH}$, such that $$depth_{TH} \frac{\sum_{j=1}^{4} \Delta d1_j}{4}.$$

If $d1_1^v - d1_{min}^v \geq depth_{TH}$, an item of reliability information $F1_1$ is set to a first value $V3$, such that for example $V3=0$, to indicate that the depth value of the pixel $p1_1$ in the projected depth map $D_1^v$ is not reliable with respect to the minimum depth value $d1_{min}^v$.

As a variant, the comparison is $d1_1^v - d1_{min}^v > depth_{TH}$.

If $d1_1^v - d1_{min}^v < depth_{TH}$, an item of reliability information $F1_1$ is set to a second value $V4$, such that for example $V4=1$, to indicate that the depth value of the pixel $p1_1$ in the projected depth map $D_1^v$ is reliable with respect to the minimum depth value $d1_{min}^v$.

As a variant, the comparison is $d1_1^v - d1_{min}^v \leq depth_{TH}$.

If $d1_{max}^v - d1_1^v \geq depth_{TH}$, an item of reliability information $F1_{1min}$ is set to a first value $V3$, such that for example $V3=0$, to indicate that the depth value of the pixel $p1_1$ in the projected depth map $D_1^v$ is not reliable with respect to the maximum depth value $d1_{max}^v$.

As a variant, the comparison is $d1_{max}^v - d1_1^v > depth_{TH}$.

If $d1_{max}^v - d1_1^v < depth_{TH}$, an item of reliability information $F1_{1max}$ is set to a second value $V4$, such that for example $V4=1$, to indicate that the depth value of the pixel $p1_1$ in the projected depth map $D_1^v$ is reliable with respect to the maximum depth value $d1_{max}^v$.

As a variant, the comparison is $d1_{max}^v \, d1_1^v \leq depth_{TH}$.

The calculation described above is iterated for the pixel $p1_2$ of the projected depth map $D_2^v$, and so on up to the pixel $p1_4$ of the projected depth map $D_4^v$.

The calculation is then iterated for each following pixel $p2_1$ to $pQ_1$ of the projected depth map $D_1^v$, for each following pixel $p2_2$ to $pQ_2$ of the projected depth map $D_2^v$, for each following pixel $p2_3$ to $pQ_3$ of the projected depth map $D_3^v$, for each following pixel $p2_4$ to $pQ_4$ of the projected depth map $D_4^v$.

The conditional modification S2 is then implemented in the following manner.

For a given pixel $pi_1$ ($1 \leq i \leq Q$) of the projected depth map $D_1^v$, it is determined whether:
the reliability information $Fi_{1min}$, associated with the pixel $pi_1$, is at 0 or 1,
the reliability information $Fi_{1max}$, associated with the pixel $pi_1$, is at 0 or 1.

If $Fi_{1min}=0$ and $Fi_{1max}=0$, the depth value $di_1^v$ of the pixel $pi_1$ of the projected depth map $D_1^v$ is not modified.

If $Fi_{1min}=1$ and $Fi_{1max}=0$, the depth value $di_{1min}^v$ of the pixel $pi_1$ of the projected depth map $D_1^v$ is modified in S23 according to the following relationship:

$\overline{dl_{1min}^v} = \text{mean}((Ai_1, Ci_1, di_1^v)$ and/or $(Ai_2, Ci_2, di_2^v)$ and/or $(Ai_3, Ci_3, di_3^v)$ and/or $(Ai_4, Ci_4, di_4^v))$, depending on whether $Ai_2=V1$ or $Ai_2=V2$, $Ai_3=V1$ or $Ai_3=V2$, $Ai_4=V1$ or $Ai_4=V2$.

According to one particular example, only the depth values $di_1^v$ and $di_2^v$ are taken into account in the modification of $di_{1min}^v$. The depth value $di_{1min}^v$ of the pixel $pi_1$ of the projected depth map $D_1^v$ is then modified according to the following relationship:

$$\overline{d_{i_{1min}}^v} = \frac{Ci_1 * di_1^v + Ci_2 * di_2^v}{Ci_1 + Ci_2}$$

If $Fi_{1min}=0$ and $Fi_{1max}=1$, the depth value $di_{1max}^v$ of the pixel $pi_1$ of the projected depth map $D_1^v$ is modified according to the following relationship:

$\overline{dl_{1max}^v} = \text{mean}((Ai_1, Ci_1, di_1^v)$ and/or $(Ai_2, Ci_2, di_2^v)$ and/or $(Ai_3, Ci_3, di_3^v)$ and/or $(Ai_4, Ci_4, di_4^v))$, depending on whether $Ai_2=V1$ or $Ai_2=V2$, $Ai_3=V1$ or $Ai_3=V2$, $Ai_4=V1$ or $Ai_4=V2$.

According to one particular example, only the depth values $di_1^v$, $di_3^v$ and $di_4^v$ are taken into account in the modification of $di_{1max}^v$. The depth value $di_{1max}^v$ of the pixel $pi_1$ of the projected depth map $D_1^v$ is then modified according to the following relationship:

$$\overline{d_{i_{1max}}^v} = \frac{Ci_1 * di_1^v + Ci_3 * di_3^v + Ci_4 * di_4^v}{Ci_1 + Ci_3 + Ci_4}$$

If $Fi_{1min}=1$ and $Fi_{1max}=1$:
the depth value $di_{1min}^v$ of the pixel $pi_1$ of the projected depth map $D_1^v$ is then modified according to the following relationship:

$$\overline{d_{i_{1min}}^v} = \frac{\sum_{j=1}^{4} (Ci_j * di_j^v)}{\sum_{j=1}^{4} (Ci_j)}$$

the depth value $di_{1max}^v$ of the pixel $pi_1$ of the projected depth map $D_1^v$ is then modified according to the following relationship:

$$\overline{d_{i_{1max}}^v} = \frac{\sum_{j=1}^{4} (Ci_j * di_j^v)}{\sum_{j=1}^{4} (Ci_j)}$$

The conditional modification S2 described above is applied to the maximum and/or minimum depth value of each of the pixels $p1_j, p2_j, \ldots, pQ_j$ of the projected depth map $D_1^v$ and is iterated for each pixel of each of the other projected depth maps $D_2^v, D_3^v, D_4^v$.

On completion of the conditional modification S2, the following are obtained, according to the value of the items of reliability information $Fi_{jmin}$ and $Fi_{jmax}$:
an unmodified projected depth map $D_1^v$ or a modified projected depth map $\overline{D_{1min}^v}$ and/or a modified projected depth map $\overline{D_{1max}^v}$,
an unmodified projected depth map $D_2^v$ or a modified projected depth map $\overline{D_{2min}^v}$ and/or a modified projected depth map $\overline{D_{2max}^v}$,
an unmodified projected depth map $D_3^v$ or a modified projected depth map $\overline{D_{3min}^v}$ and/or a modified projected depth map an unmodified projected depth map $D_4^v$ or a modified projected depth map $\overline{D_{4min}^v}$ and/or a modified projected depth map $\overline{\overline{D_{4min}^v}}$.

8. EXEMPLARY IMPLEMENTATION OF SYNTHESIS DEVICE

FIG. 5 shows the simplified structure of a synthesis device SYNT designed to implement the synthesis method according to any one of the particular embodiments of the invention.

According to one particular embodiment of the invention, the actions performed by the synthesis method are implemented by computer program instructions. To that end, the synthesis device SYNT has the conventional architecture of a computer and comprises in particular a memory MEM, a processing unit UT, equipped for example with a processor PROC, and driven by the computer program PG stored in memory MEM. The computer program PG comprises instructions for implementing the actions of the synthesis method such as described above when the program is executed by the processor PROC.

On initialization, the code instructions of the computer program PG are for example loaded into a RAM memory (not shown), before being executed by the processor PROC. The processor PROC of the processing unit UT implements in particular the actions of the synthesis method described above, according to the instructions of the computer program PG.

In the case where the images $I_1$ to $I_N$ have been decoded beforehand by a decoder DEC, according to a suitable decoding method:
- the synthesis device SYNT is arranged at the output of the decoder DEC, as illustrated in FIG. 6A, or
- the synthesis device SYNT forms part of the decoder DEC, as illustrated in FIG. 6B.

It goes without saying that the embodiments which have been described hereinabove have been given purely by way of wholly non-limiting indication, and that numerous modifications can be easily made by the person skilled in the art without however departing from the scope of the invention.

The invention claimed is:

1. A method comprising:
   synthesizing an image of a view on the basis of images of N views, where N≥2, implemented by an image synthesis device, wherein the synthesizing comprises:
   projecting, to a position corresponding to the image of the view to be synthesized, N depth maps associated with the N views, respectively, N corresponding projected depth maps being obtained, and
   for at least one given pixel of at least one current projected depth map, for which a depth value has been associated on completion of the projecting,
      generating an item of reliability information of said depth value based on:
         a maximum depth value of a pixel of a projected depth map from among said N projected depth maps and having a position identical to that of said at least one given pixel, and
         a minimum depth value of another pixel of a projected depth map from among said N projected depth maps and having a position identical to that of said at least one given pixel,
      modifying said depth value of said at least one given pixel in response to said item of reliability information associated with said depth value being at a certain value, said modification using the depth value of a pixel whose position corresponds to that of said at least one given pixel, in at least one other projected depth map, which generates at least one modified projected depth map.

2. The method as claimed in claim 1, wherein said modification uses a weighting of the depth value of the pixel whose position corresponds to said at least one given pixel, in said at least one other projected depth map.

3. The method as claimed in claim 2, comprising calculating a confidence level of a pixel of a given depth map as a variation in the depth value of said pixel, said variation corresponding to a projection error in terms of allowed number of pixels.

4. The method as claimed in claim 3, wherein the confidence level of a pixel is weighted by a coding parameter of the image of the view with which the depth map that contains said pixel is associated.

5. The method as claimed in claim 1, wherein the modification of the depth value of the given pixel comprises replacing said depth value with a value that is calculated on the basis of said depth value and of the depth value of the pixel whose position corresponds to that of said at least one given pixel in said at least one other projected depth map, said depth values each being weighted by their respective confidence level.

6. The method as claimed in claim 1, wherein generating the item of reliability information comprises the following acts:
   determining, in the set of N projected depth maps, for one and the same position as that of the given pixel, which pixel has the maximum depth value and which pixel has the minimum depth value,
   calculating the difference between the maximum and minimum depth values,
   comparing the calculated difference with a threshold, and
   generating the item of reliability information, the value of which is dependent on the result of the comparison.

7. The method as claimed in claim 6, wherein the threshold is equal to the mean of the N variations in the depth value of each pixel whose position corresponds to that of said given pixel in their respective depth map.

8. The method as claimed in claim 6, wherein the threshold is equal to the mean of the N variances in the depth value of each pixel whose position corresponds to that of said given pixel in their respective depth map.

9. The method as claimed in claim 1, wherein generating the item of reliability information comprises the following acts:
   determining, in the set of N projected depth maps, for one and the same position as that of the given pixel, which pixel has the maximum depth value and which pixel has the minimum depth value,
   calculating a difference between the depth value of said given pixel and the determined minimum depth value,
   comparing the calculated difference with a threshold,
   generating an item of reliability information with respect to the determined minimum depth value, the value of which is dependent on the result of the comparison,
   calculating another difference between the determined maximum depth value and the depth value of said given pixel,
   comparing the other calculated difference with said threshold, and
   generating the item of reliability information with respect to the determined maximum depth value, the value of which is dependent on the result of the comparison.

10. The method as claimed in claim 9, wherein the threshold is equal to the mean of the N variations in the depth value of each pixel whose position corresponds to that of said given pixel in their respective depth map.

11. The method as claimed in claim 9, wherein the threshold is equal to the mean of the N variances in the depth value of each pixel whose position corresponds to that of said given pixel in their respective depth map.

12. The method as claimed in claim 1, wherein the method further comprises:
   decoding a data signal representative of a set of images of N coded views, where N≥2, comprising decoding the images of the N coded views, producing a set of images of N decoded views,
   performing the synthesizing on the basis of said set of images of N decoded views.

13. A device for synthesizing an image of a view on the basis of images of N views, where N≥2, said synthesis device being comprising a processor that is configured to implement:
   projecting, to a position corresponding to the image of the view to be synthesized, N depth maps associated with the N views, respectively, N corresponding projected depth maps being obtained, and
   for at least one given pixel of at least one current projected depth map, for which a depth value has been associated on completion of the projecting,
   generating an item of reliability information of said depth value based on:
      a maximum depth value of a pixel of a projected depth map from among said N projected depth maps and having a position identical to that of said at least one given pixel, and
      a minimum depth value of another pixel of a projected depth map from among said N projected depth maps and having a position identical to that of said at least one given pixel,
   modifying the depth value of said at least one given pixel in response to said item of reliability information associated with said depth value being at a certain value, said modification using the depth value of a pixel whose position corresponds to that of said at least one given pixel, in at least one other projected depth map, which generates at least one modified projected depth map.

14. The device as claimed in claim 13 wherein the processor is further configured to decode a data signal representative of a set of images of N coded views, where N≥2, wherein the processor is further configured to:
   decode the images of the N coded views, producing a set of images of N decoded views, and
   perform the synthesizing on the basis of said set of images of N decoded views.

15. A non-transitory computer-readable information medium comprising instructions of a computer program, which when executed by a processor of a synthesizing device configure the synthesizing device to synthesize an image of a view on the basis of images of N views, where N≥2, wherein the synthesizing comprises:
   projecting, to a position corresponding to the image of the view to be synthesized, N depth maps associated with the N views, respectively, N corresponding projected depth maps being obtained, and
   for at least one given pixel of at least one current projected depth map, for which a depth value has been associated on completion of the projecting,
   generating an item of reliability information of said depth value based on:
      a maximum depth value of a pixel of a projected depth map from among said N projected depth maps and having a position identical to that of said at least one given pixel, and
      a minimum depth value of another pixel of a projected depth map from among said N projected depth maps and having a position identical to that of said at least one given pixel,
   modifying said depth value of said at least one given pixel in response to said item of reliability information associated with said depth value being at a certain value, said modification using the depth value of a pixel whose position corresponds to that of said at least one given pixel, in at least one other projected depth map, which generates at least one modified projected depth map.

16. A device for decoding a data signal representative of a set of images of N coded views, where N≥2, said decoder comprising:
   a processor configured to decode the images of the N coded views, producing a set of images of N decoded views; and
   a device for synthesizing an image of a view on the basis of said set of images of N decoded views, said synthesis device comprising a processor that is configured to implement:
   projecting, to a position corresponding to the image of the view to be synthesized, N depth maps associated with the N decoded views, respectively, N corresponding projected depth maps being obtained, and
   for at least one given pixel of at least one current projected depth map, for which a depth value has been associated on completion of the projecting,
   generating an item of reliability information of said depth value based on:
      a maximum depth value of a pixel of a projected depth map from among said N projected depth maps and having a position identical to that of said at least one given pixel, and
      a minimum depth value of another pixel of a projected depth map from among said N projected depth maps and having a position identical to that of said at least one given pixel,
   modifying the depth value of said at least one given pixel in response to said item of reliability information associated with said depth value being at a certain value, said modification using the depth value of a pixel whose position corresponds to that of said at least one given pixel, in at least one other projected depth map, which generates at least one modified projected depth map.

* * * * *